United States Patent [19]
Kiyohara et al.
[11] Patent Number: 4,719,475
[45] Date of Patent: Jan. 12, 1988

[54] INK-JET RECORDING APPARATUS AND INK TANK USED THEREIN

[75] Inventors: Takehiko Kiyohara, Zama; Hideo Fukazawa, Yokohama, both of Japan

[73] Assignee: Canon Kabushiki Kaisha, Tokyo, Japan

[21] Appl. No.: 846,889

[22] Filed: Apr. 1, 1986

[30] Foreign Application Priority Data

| | | | |
|---|---|---|---|
| Apr. 10, 1985 | [JP] | Japan | 60-076201 |
| Apr. 10, 1985 | [JP] | Japan | 60-076202 |
| Apr. 10, 1985 | [JP] | Japan | 60-076203 |
| Apr. 10, 1985 | [JP] | Japan | 60-076204 |
| Apr. 10, 1985 | [JP] | Japan | 60-076205 |
| Apr. 10, 1985 | [JP] | Japan | 60-076206 |

[51] Int. Cl.4 .......... G01D 15/16
[52] U.S. Cl. .......... 346/140 R; 73/304 R; 101/364
[58] Field of Search .......... 346/140, 75; 101/366, 101/364; 73/304 R

[56] References Cited

U.S. PATENT DOCUMENTS

| | | | |
|---|---|---|---|
| 4,202,267 | 5/1980 | Heinzl | 346/140 X |
| 4,415,886 | 11/1983 | Kyogoku | 346/140 X |
| 4,419,678 | 12/1983 | Kasugayama | 346/140 |
| 4,429,320 | 1/1984 | Hattori | 346/140 |
| 4,447,820 | 5/1984 | Terasawa . | |
| 4,551,734 | 11/1985 | Causley | 346/140 |
| 4,610,202 | 9/1986 | Ebinoma | 346/140 X |

FOREIGN PATENT DOCUMENTS

| | | |
|---|---|---|
| 2617730C2 | 3/1977 | Fed. Rep. of Germany . |
| 2715599 | 12/1978 | Fed. Rep. of Germany . |
| 2728283C2 | 4/1979 | Fed. Rep. of Germany . |
| 3220939A1 | 5/1983 | Fed. Rep. of Germany . |
| 1355915 | 6/1974 | United Kingdom . |

*Primary Examiner*—Joseph W. Hartary
*Attorney, Agent, or Firm*—Fitzpatrick, Cella, Harper & Scinto

[57] ABSTRACT

An ink tank suitable for use in an ink-jet recording apparatus, comprises a closed ink bladder of a flexible material, the ink bladder being formed by assembling two double-folded sheets with each other or by folding a single sheet with the peripheral matched portions of the folded sheets or sheet adhered to each other, and the larger sheet or said single sheet includes a plug member sealingly attached thereto at a position adjacent to the folded portion of the larger sheet or adjacent to the corresponding portion of said single sheet, said plug member having an ink outlet port. In an ink-jet recording apparatus comprising such a closed ink bladder of a flexible material for supplying ink to a recording head, the plug member mounted on said ink bladder includes a pair of upper and lower electrodes exposed to the ink in said ink bladder, inwardly extending ribs disposed on the opposite sides of said plug member and effective to prevent said ink bladder from completely collapsing, and detection means for sensing a change in electrical resistance between said electrodes to detect the residual amount of ink within said ink bladder when a gas enclosed in said ink bladder reaches between said ribs.

31 Claims, 11 Drawing Figures

INK-JET RECORDING APPARATUS AND INK TANK USED THEREIN

BACKGROUND OF THE INVENTION

1. Field of the Invention

The present invention relates to an ink-jet recording apparatus of such a type that recording head means receives ink from a closed blader containing a supply of ink and being made of a flexible material such as a plastic sheet, and an ink tank used therein to house such a closed bladder.

2. Related Background Art

Attention is recently drawn to an ink-jet recording apparatus since it is suitable for monochrome as well as color recordings. For color and gradation recordings, a plurality of ink tanks corresponding to the number of ink colors (for example, yellow, magenta, cyan and black) and the same number of recording heads are required. Besides hue, the use of thick and thin inks also requires a plurality of ink tanks. This is true in either of a serial type ink-jet recording apparatus in which scanning is effected by carriage means or a full-line type ink-jet recording system in which scanning is carried out in each transmission of paper.

In such ink-jet recording apparatus, an ink bladder is used which is made of a flexible material such as plastics sheet, metal-plastics sheet lamination or the like. The ink bladder is replenished with new ink while expelling air out of the bladder. A pair of electrodes are disposed at spaced positions, for example, at upper and lower positions within the bladder such that the residual amount of ink within the bladder will be sensed by measuring changes in the electric resistance between the electrodes. In such an ink sensing method, however, some amount of ink frequently remains between the electrodes even after the ink bladder has collapsed due to reduced amount of ink. This does not provide an accurate detection of ink in the bladder.

To overcome such a problem, a hard vessel may be used to contain ink in place of such a flexible ink bladder. The hard vessel must have a vent to prevent the internal pressure of the vessel from being changed. This provides additional problems in that the ink solvent is evaporated through the vent to change the properties of the ink within the bladder such as viscosity and others and in that the ink tends to leak out of the bladder through the vent.

The ink bladder is normally in the form of "a floor cushion" made of a plastics sheet or the like. Such a form of ink bladder is mounted within the ink-jet recording system in a substantially horizontal position. Therefore, the ink bladder is reduced in thickness to decrease the internal pressure of the ink bladder. In such a case, there are still other problems that the size of the ink vessel is undesirably reduced and that the residual amount of ink in the ink bladder is difficult to be sensed. Particularly, a pair of upward and downward electrodes spaced away from each other to sense the residual amount of ink due to changes in the electrical resistance between the electrodes are substantially difficult to be used.

In an ink-jet recording apparatus including a plurality of ink reservoirs, a pair of spaced electrodes is disposed within each of the ink reservoirs to measure the change of electric resistance between the electrodes, depending on the residual amount of ink within that ink reservoir. In such a case, a set of measuring and sensing circuits are required for each of the ink reservoirs. Therefore, the associated detecting means is costly and complex.

SUMMARY OF THE INVENTION

It is an object of the present invention to provide an ink-jet recording apparatus and an ink tank used therein, which can solve the aforementioned problems in the prior art.

Another object of the present invention is to provide an ink-jet recording apparatus and an ink tank used therein, which can sense the residual amount of ink in a closed ink bladder by the use of a pair of electrodes and yet can easily set the residual amount of ink to be sensed at a desired level.

Still another object of the present invention is to provide an ink-jet recording apparatus and an ink tank used therein, which can utilize a reduced space containing an ink bladder of an increased capacity and which can include sensor means for sensing the residual amount of ink within the ink bladder, the sensor means including a pair of electrodes disposed within the ink bladder and used to measure a change in the electrical resistance between the electrodes, representative of the residual amount of ink within the ink bladder.

A further object of the present invention is to provide an ink-jet recording apparatus comprising residual ink sensing means of a simple circuit for sensing the residual amounts of ink within a plurality of ink reservoirs.

A further object of the present invention is to provide an ink tank for ink-jet recording systems, the ink tank housing a closed ink bladder made of a flexible material, the ink bladder being formed by assembling two double-folded sheets of different sizes or using a single sheet double-folded into a similar configuration to join the peripheral portions thereof to form a bladder, the larger sheet or single sheet including a plug member having an ink outlet port adjacent to the folded portion of the larger sheet or at the corresponding portion of the single sheet.

A further object of the present invention is to provide an ink-jet recording apparatus in which said ink bladder containing ink is mounted therein in a vertical position with the folded portion of said larger sheet or the corresponding portion of said single sheet being located downwardly.

A further object of the present invention is to provide an ink-jet recording apparatus comprising a closed ink bladder of a flexible material for supplying ink to a recording head, a plug member disposed on the ink bladder and including a pair of upper and lower electrodes which are exposed to the ink in the bladder, inwardly extending ribs on the opposite sides of said plug member for preventing the ink bladder from being completely collapsed, and sensor means for sensing the residual amount of ink within the ink bladder from a change in electrical resistance between said electrodes which is produced when gas charged in the ink bladder reaches between said ribs.

A further object of the present invention is to provide an ink tank comprising an ink bladder formed of a flexible material, a plug member for discharging ink out of the ink bladder, electrode means for sensing the amount of ink within the ink bladder and rib means extending inwardly within the ink bladder to form a space surrounding the electrode means.

A further object of the present invention is to provide an ink-jet recording apparatus comprising a plurality of ink reservoirs for supplying ink to the respective recording heads, a pair of electrodes exposed to the ink within each of the ink reservoirs and connected in series with each other, and a sensor circuit for measuring an electric resistance between each pair of series-connected electrodes to sense the residual amount of ink in the corresponding ink reservoir.

DESCRIPTION OF PREFERRED EMBODIMENTS

Figure 1:
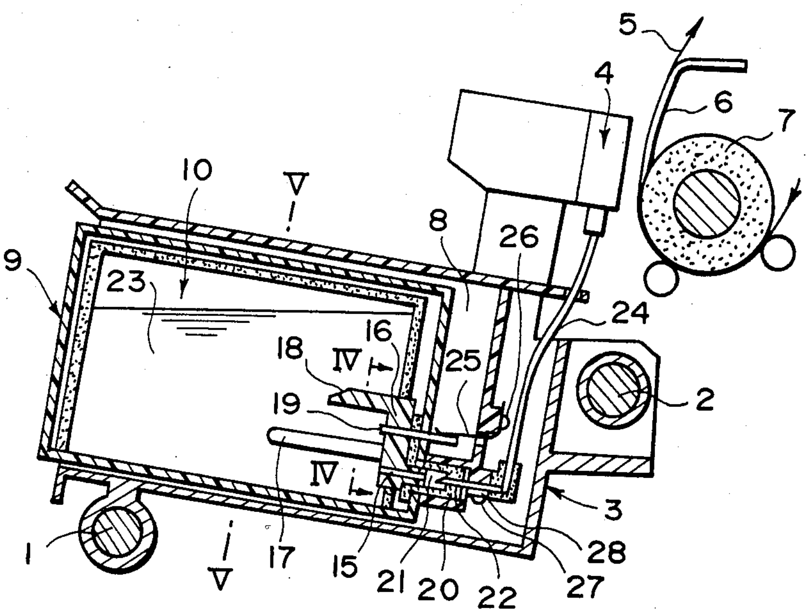
FIG. 1 is a longitudinal section of the primary parts of an ink-jet recording apparatus which is one embodiment of the present invention.

Referring first to FIG. 1, there is shown an ink-jet recording apparatus comprising a carriage 3 movably mounted on guide shafts 1 and 2 and a recording head 4 mounted on the carriage 3. The recording head 4 includes orifice means which is adapted to discharge droplets of ink on a sheet of paper 5 to be printed as the carriage 3 runs along the length of the guide shafts 1 and 2. The paper 5 is backed up by a platen 6 and moved by a feed roller 7 in a direction shown by arrow in FIG. 1.

The carriage 3 includes a chamber 8 in which a cartridge 9 as an ink tank is removably mounted. The cartridge 9 houses a closed ink bladder 10 made of a flexible material such as a plastic sheet or the like. Ink is supplied from the ink bladder 10 to the recording head 4.

Figure 5:
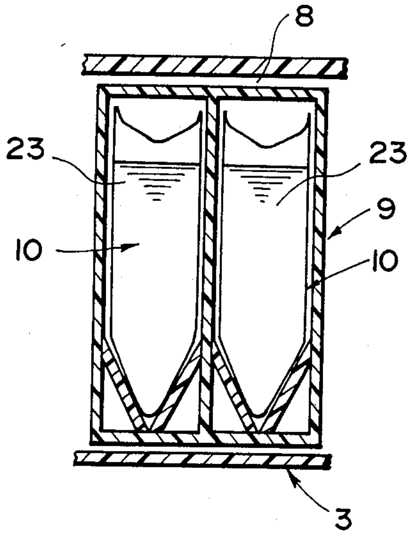
FIG. 5 is a cross-sectional view taken along a line V—V in FIG. 1.

For normal monochrome printing, a single ink bladder and recording head 10, 4 are used. However, for color print with a plurality of colors (for example, yellow, magenta, cyan and black) or for light-and-shade print with a single color, a plurality of ink bladders 10 are used with the corresponding number of recording heads 4, depending on the number of the types of ink used. The present embodiment utilizes a cartridge 9 containing two ink bladders 10 as shown in FIG. 5.

Figure 2:
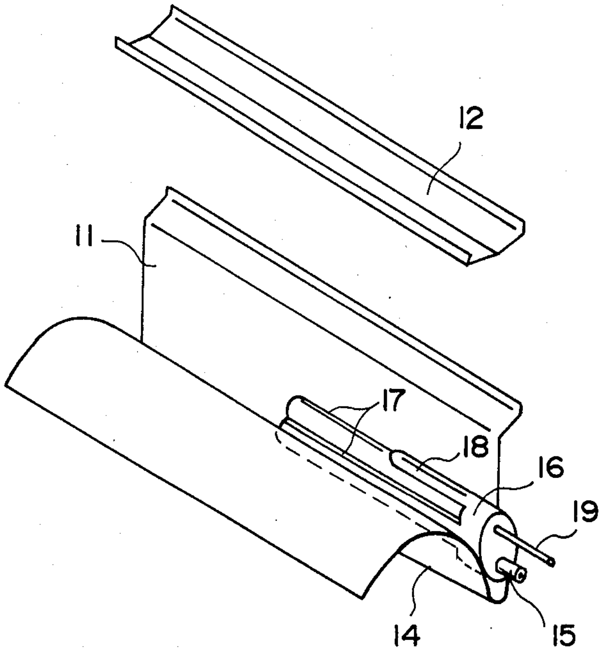
FIG. 2 is an exploded perspective view of an ink bladder shown in FIG. 1 before assembly.
Figure 4:
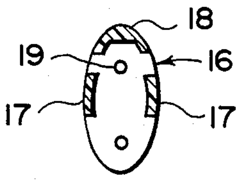
FIG. 4 is a fragmentary cross-sectional view of a plug member, taken along a line IV—IV in FIG. 1.
Figure 3:
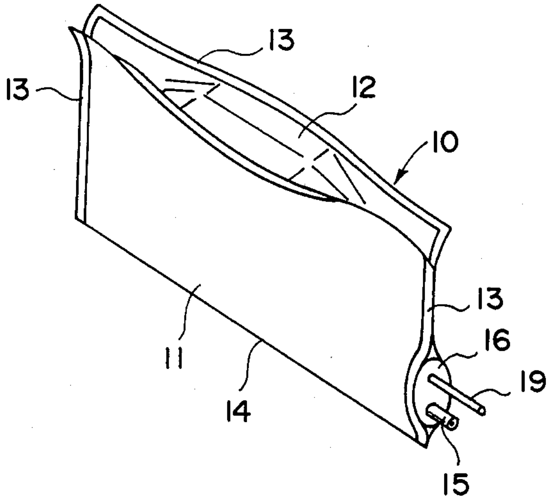
FIG. 3 is a perspective view of the ink bladder after it is closed and assembled.

FIGS. 2 to 4 illustrate the structure of said ink bladder 10.

The ink bladder is constructed by assembling two double-folded sheets 11 and 12 of different sizes with each other, as shown in FIG. 2. The peripheral matched portions 13 of the assembled sheets contacting with each other as shown in FIG. 4 are adhered to form a bladder. The larger double-folded sheet 11 includes a plug member 16 sealingly connected therewith between the matched sheet portions at a position adjacent to the folded portion 14 of the sheet 11. The plug member 16 is a molding of any suitable insulation material such as plastics or the like and includes an ink outlet pipe 15 molded integrally therewith.

The plug member 16 also includes a pair of inwardly extending ribs 17 formed integrally therein at the opposite inner walls, which ribs serve to prevent the ink bladder 10 from being completely collapsed. The plug member 16 further includes a rooflike cover 18 formed integrally therein at the top and extending inwardly therefrom to cover part of a space between the ribs 17. The cover 18 functions to effectively hold air within the ink bladder and thus to enable a more accurate detection of the residual amount of ink within the ink bladder as will be described hereinafter.

The plug member 16 further includes an electrode 19 extending outwardly therethrough at a position above the ink outlet pipe 15 and below the cover 18. The inner end of the electrode 19 is exposed to the ink within the ink bladder 10.

As seen from FIG. 1, the cartridge 9 includes a plug of rubber 20 mounted thereon about the ink outlet portion and sealingly fitted over the ink outlet pipe 15 of the plug member 16. The electrode 19 extends outwardly though the rubber plug 20 and the forward wall of the cartridge 9. The rubber plug 20 is formed with an internal ink chamber 21 which communicates with the interior of the ink bladder 10 through the ink outlet pipe 15.

A hollow needle 22 of a conductive material (normally, metal) is fixedly mounted on the forward portion (rightward portion as viewed in FIG. 1) of the cartridge containing chamber 8 and extends into the ink chamber 21 through the rubber plug 20 when the cartridge 9 is mounted. Thus, the distal end of the hollow needle 22 is exposed to the ink 23 in the ink bladder 10 through the ink chamber 20 and the ink outlet pipe 15. The hollow needle 22 defines another electrode, so that a pair of upper and lower electrodes will be provided by the hollow needle 22 and the electrode 19.

As seen from FIGS. 1 and 5, the ink bladder 10 containing the ink 23 is mounted and positioned vertically within the cartridge 9 with the folded portion 14 (FIGS. 2 and 3) of the larger sheet 11 positioned downwardly. The cartridge 9 also is mounted vertically within the carriage 3. Under such a position, air is collected upwardly within the ink bladder 10 and will not penetrate into the ink outlet pipe 15 disposed on the ink bladder 10 adjacent to the folded portion 14 of the larger sheet 11.

The bottom portion of the cartridge 9 on which the ink bladder 10 is placed is of V- or U-shaped cross-section such that the bottom of the ink bladder 10 containing the ink 23 can closely be placed on the internal bottom of the cartridge 9 to prevent the ink bladder 10 from being broken or displaced under any accidental vibration or impact.

It is desirable that the ink bladder 10 contains an amount of gas (for example, air) with the ink 23. The amount of gas is preferably in the range of 0.5 c.c. to 1 c.c. It has been found that if the amount of gas is less than 0.5 c.c., the residual amount of ink cannot accurately be sensed. If the amount of gas is equal to or more than 0.5 c.c., the residual amount of ink can accurately be sensed in practice. For example, when the ink bladder contains an amount of air equal to 0.5 c.c., tests showed that the residual amount of ink within the ink bladder which had been set could accurately be sensed in a rate equal to 99%. When the amount of air is equal to 1 c.c., the residual amount of ink can accurately be sensed up to 100%. Since if the amount of air is too much, the amount of ink to be contained is reduced or the capacity of the ink tank is increased, the amount of air should be limited to be necessary and minimum.

The proximal end of the hollow needle 22 is connected with the recording head 4 through an ink supplying tube 24 which is made of an insulation material such as plastics or the like.

The electrode (upper electrode) 19 on the plug member 16 has its outer end extending outwardly from the cartridge 9, which is electrically connected with a terminal 26 on the carriage 3 through a leaf-like conductive spring 25 when the cartridge 9 is mounted in the carriage 3, as shown in FIG. 1.

The other electrode, that is, the hollow needle 22 is rigidly mounted on the carriage 3 by means of a conductive screw 27 such that the needle will penetrate through the rubber plug 20 and be exposed at the distal end to the ink within the ink bladder 10 when the cartridge 9 is mounted in the carriage 3. Thus, the head of the conductive screw 27 functions as a terminal on the carriage side for the lower electrode (hollow needle), in the illustrated embodiment.

The pair of upper and lower electrodes 19 and 22 are connected at their terminals 26 and 27 with a sensor circuit (not shown) which can measure an electrical resistance between the electrodes.

In this connection, it is to be noted that the ink 23 is more electrically conductive than that of the gas contained within the ink bladder 10 to provide an electrical resistance different from that of the gas.

As the ink 23 in the ink bladder 10 is used, the ink bladder 10 collapses increasingly. Since the ink bladder 10 is formed by the sheets 11 and 12 of different sizes as shown in FIG. 3, the top portion thereof can sufficiently be widened when the ink bladder 10 is filled with ink and easily be reduced in width as the ink is being used. Therefore, the ink bladder 10 can receive an increased amount of ink and can collapse easily as the amount of the ink contained in the ink bladder 10 is being decreased. Consequently, the level of ink within the ink bladder 10 will not very be changed and is maintained at a high level until the residual amount of ink becomes substantially small. The enclosed gas remains above the level of ink. Under such a condition, the ink 23 exists between the pair of electrodes 19 and 22 to provide an electrical resistance therebetween at a small value.

If the ink is used up to a preset level, the ink bladder 10 substantially completely collapses except the area of the ribs 17 in the plug member 16 and, as the case may be, the folded portion (bottom) of the larger sheet 11. Under such a situation, the enclosed gas is moved downwardly within the ink bladder 10 and then penetrate into the space (the uncollapsed space between the ribs 17) which contacts the plug member 16. Thus, the electrical resistance between the electrodes 19 and 22 is rapidly changed by the existance of the moved gas therebetween. By sensing this rapidly changed electrical resistance, it can be known that the residual amount of ink reaches the preset level within the ink bladder 10.

In practice, it is desirable that the above preset level is in such a range that at least one sheet of paper can be printed by the use of the residual ink within the ink bladder. If the used ink bladder is replaced by a new ink bladder, a test recording is generally carried out to know whether or not ink is positively delivered from the new ink bladder to the head nozzle. When the ink bladder is changed from one to another during recording and if the test recording is carried out on the same or other recording paper, the continuity of recording will be lost.

It is further required that current is supplied to the ink with as less number and time as possible since the ink may be electrolized when it is influenced by the current at all times. In accordance with the present invention, current is supplied to the ink in the ink bladder for a brief time to measure the resistance in the ink, for example, when a printer is energized; after the ink has been drawn from the tip of the head nozzle by means of a pump (not shown); after no cut paper has existed in place upon completion of the recording operation; when a continuous paper is moved through a specified length and so on.

In the illustrated structure of the ink bladder 10, a desired amount of ink can be left between the upper and lower electrodes 19 and 22 when the electrical resistance therebetween is to be sensed. This is very practicable as ink sensing means.

When the amount of gas enclosed within the ink bladder 10 is more, the electrodes 19 and 22 are correspondingly separated by the gas earlier, that is, when the residual amount of ink within the ink bladder is still much more. In the illustrated structure of the ink bladder 10, the amount of enclosed gas can be adjusted depending on a preset amount of ink to be sensed. On the contrary, this means that a residual amount of ink can freely be adjusted simply by regulating an amount of enclosed gas such as air or the like.

When the amount of gas enclosed within the ink bladder 10 is unvariable and if the length of the anticollapsing and inwardly extending ribs 17 is increased, the electrodes 19 and 22 is correspondingly separated from each other by the gas earlier, that is, when the residual amount of gas is still much more. In the illustrated structure of the ink bladder 10, therefore, the length of the inwardly extending ribs 17 can be adjusted depending on a desired residual amount of ink or an amount of ink to be sensed when the amount of enclosed gas is substantially constant. This means that a value to be detected can freely be adjusted by regulating the length of the ribs 17.

Figure 6A:
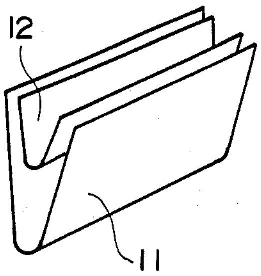
FIGS. 6A to 6D illustrate various types of ink bladders usable in the present invention.
Figure 6C:
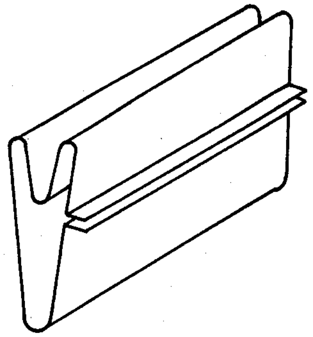
Figure 6B:
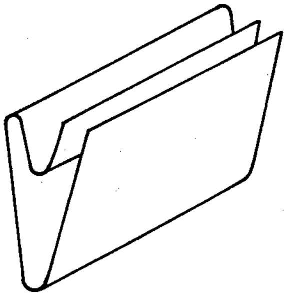
Figure 6D:
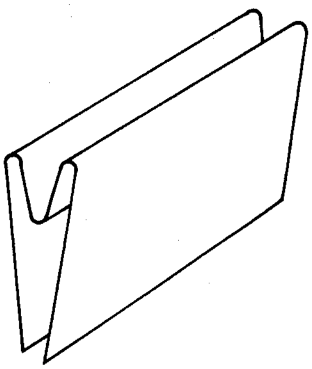

The ink bladder 10 constructed in the manner as shown in FIGS. 2 and 3 may be replaced by an ink bladder constructed and formed from a single sheet as shown in FIGS. 6B, 6C and 6D. Contrary to an ink bladder formed from two sheets as shown in FIG. 6A, an ink bladder of a single sheet can be folded into a similar configuration with a plug member attached thereto, in the manner as shown in each of FIGS. 6B to 6D.

In accordance with the embodiments described above, the residual amount of ink in the ink bladder 10 can easily be sensed by measuring the electrical resistance between the pair of electrodes 19 and 22 even if a closed ink bladder is utilized as an ink reservoir for supplying ink to a recording head. And yet, the residual amount of ink to be sensed may easily be set at a desired value.

Furthermore, since the ink bladder is formed from two folded sheets 11 and 12 or a single folded sheet, a space receiving the ink bladder can be reduced while increasing the amount of ink to be contained in the ink bladder.

Although the described embodiment has used the hollow needle 22 forming part of the ink supplying passage as a lower electrode, such a lower electrode may be of a separate part from the hollow needle.

Athough the embodiment has been described as to the serial type recording apparatus having the carriage 3, the present invention may similarly be applied to a line type ink-jet recording apparatus.

The present invention may be embodied in various different forms irrespective of the number of the recording heads 4, cartridges 9 and ink bladders 10 and/or independently of the place of them if they are mounted in the recording apparatus at a part other than the carriage 3.

The present invention will now be described with respect to means for sensing the residual amount of ink in the ink bladder.

As described hereinbefore in connection with FIG. 1, each of the ink bladders 10 includes a plug member 18 of an insulation material such as plastics or the like which is sealingly attached thereto. The plug member 18 includes an ink outlet pipe 15 formed integrally therein and an upper electrode 19 extending through the plug member 18 above the ink outlet pipe 15 with the inner end exposed to the ink 23 in the ink bladder 10. The ink outlet pipe 15 is sealingly connected with one end of a hollow needle 22 with the other end thereof being connected with the corresponding recording head 4 through an ink supplying tube 24 which is made of an insulation material such as plastics or the like.

Part of the upper electrode 19 extending outwardly from the cartridge 9 is electrically connected with a leaf-spring type terminal 25 of a conductive material which is rigidly mounted on the carriage side by means of a screw 26, when the cartridge 9 is mounted in the carriage 3.

The lower electrode (hollow needle) 22 is fixedly mounted on the carriage 3 such that the needle will penetrate through the rubber plug 20 into a position exposed to the ink in the ink bladder 10 when the cartridge 9 is mounted in the carriage 3.

It is to be understood that the ink 23 has an electrical conductivity higher than that of a gaseous body such as air contained in an ink reservoir (ink bladder) to provide an electrical resistance different from that of the gaseous body.

The pair of electrodes 19 and 22 in each of the ink reservoirs 10 is utilized to sense a difference in electrical resistance between the ink 24 and the gas to know a residual amount of ink in the ink reservoir 10.

Figure 7:
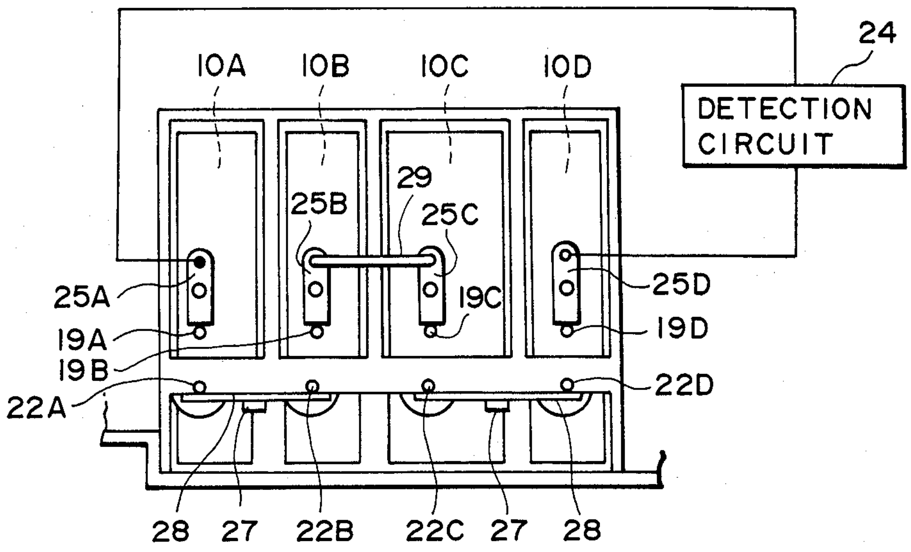
FIG. 7 is a front elevational view of electrical connections used in the ink-jet recording apparatus shown in FIG. 1.
Figure 8:
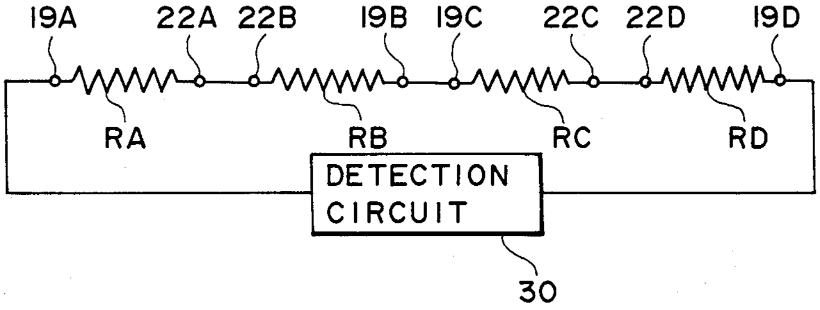
FIG. 8 is a circuit diagram of ink sensing means constructed by the electrical connections shown in FIG. 7.

More particularly, the electrical resistance is smaller if the space between the electrodes 19 and 22 is occupied by the ink 23 while the electrical resistance is increased if the residual amount of ink reaches a predetermined level and when the space between the electrodes 19 and 22 is occupied by the gas. This principle is utilized to sense the residual amount of ink in the ink reservoir.

Where four ink reservoirs (ink bladders) 10 are used, an ink detection circuit may be used which is connected with the electrodes on the respective ink reservoirs as shown in FIGS. 7 and 8.

In FIGS. 7 and 8, the four ink reservoirs 10 are distinguished from one another by four capital letters A, B, C and D attached from left to right as viewed in FIG. 7. The respective upper electrodes are designated 19A, 19B, 19C and 19D while the respective lower electrodes are denoted 22A, 22B, 22C and 22D.

As seen from FIG. 7, the lower electrodes 22A to 22D on the respective ink reservoirs 10A to 10D are paired into two pairs each of which is in contact with a pressure plate 28 of a conductive material such as iron or the like. Each of the pressure plates 28 is rigidly mounted on the carriage 3 by means of a set screw 27.

Two inward ink reservoirs 10B and 10C are electrically connected with two leaf-spring type terminals 25B and 25C which are electrically connected with each other through a conductive member 29.

In such a manner, all the upper and lower electrodes 19A–19D and 22A–22D on the respective ink reservoirs 10A–10D are connected in series. More particularly, if there is an equivalent circuit having resistances RA, RB, RC and RD between the corresponding pair of electrodes on the respective ink reservoirs as shown in FIG. 8, the respective electrodes are connected in series in the order of 19A–22A–22B–19B–19C–22C–22-D–19D.

The electrodes on the opposite ends of such a series connection (19A and 19D in the illustrated embodiment) are connected with the opposite terminals of a detection circuit 30 for measuring an electrical resistance to sense the residual amount of ink, as shown in FIGS. 7 and 8.

On operation, if any one of the four ink reservoirs 10A–10D has the residual amount of ink reduced up to a present level, the electrical resistance between the corresponding pair of electrodes is changed or increased. This can be sensed by the detector circuit 30. This indicates that all the ink reservoirs 10 and thus the cartridge 9 should be replaced by new ink reservoirs or cartridge.

In such an arrangement, only a single detection circuit 30 may be used to sense the residual amount of ink even when a plurality of ink reservoirs are used for color print and particularly where a plurality of in reservoirs are housed in a single cartridge. This will reduce the complex and expensive construction of the ink-jet recording apparatus.

Since the hollow needle 22 for supplying ink is used also as a lower electrode, the construction of the ink tank can be simplified.

Although the illustrated embodiment has been described as to the serial type recording apparatus having the carriage 3, the present invention may similarly be applied to a line type recording apparatus. In the serial type recording apparatus, the ink reservoir (s) 10 may be mounted in the machine body at any part other than the carriage.

The flexible ink bladder may be replaced by a hard ink vessel.

Furthermore, the present invention may similarly be applied to any ink-jet recording apparatus having at least two ink reservoirs.

As will be apparent from the foregoing, the present invention provides a positive and accurate detection of the residual amount of ink in the ink bladder means with a point to be detected being readily and optionally set.

The present invention also provides an ink tank superior in space utility in that it has a reduced volume while containing more ink, and an ink-jet recording apparatus utilizing such an ink tank.

The present invention further provides a single and simple detection circuit which can be provided for at least one ink tank containing a plurality of ink reservoirs such that the residual amount of ink in any one of the ink reservoirs can positively and simply be sensed.

We claim:

1. An ink tank suitable for use in an ink-jet recording apparatus, said ink tank comprising:

a closed ink bladder of a flexible material formed by assembling at least one sheet with peripheral matched portions being bonded together to form a tubular member having a portion with a substantially U-shaped or V-shaped cross-section and portions with substantially flat sides, and a plug member sealingly attached to said ink bladder where said peripheral portions of said ink bladder are bonded together.

2. An ink tank as defined in claim 1, further comprising electrode means for sensing the amount of ink within said ink bladder and inwardly extending rib means for forming a space about said electrode means.

3. An ink tank as defined in claim 2, wherein said rib means is disposed on opposite sides of said electrode means.

4. An ink tank as defined in claim 2, wherein said rib means has an inwardly extending length determined by a preset amount of ink to be sensed.

5. An ink tank as defined in claim 2, wherein said plug member is an elastomeric material.

6. An ink tank as defined in claim 2, wherein said electrode means is disposed in said plug member.

7. An ink tank as defined in claim 2, wherein said rib means sandwiches said plug member.

8. An ink tank as defined in claim 2, further comprising an inward projection other than said rib means.

9. An ink tank as defined in claim 8, wherein said projection is disposed between said rib means.

10. An ink tank as defined in claim 8, wherein said projection is formed integrally with said plug member.

11. An ink tank as defined in claim 1, wherein said ink tank is filled with ink and gas.

12. An ink tank as defined in claim 11, wherein the amount of ink in said ink tank is determined by the amount of gas in said ink tank.

13. An ink tank as defined in claim 11, wherein the amount of said gas is equal to 0.5 c.c. or more.

14. An ink-jet recording apparatus comprising an ink tank comprising a closed ink bladder of a flexible material formed by assembling at least one sheet with peripheral matched portions being bonded together to form a tubular member having a portion with a substantially U-shaped or V-shaped cross-section and portions with substantially flat sides, and a plug member sealingly attached to said ink bladder where said peripheral portions of ink bladder are bonded together, said ink bladder being mounted in said ink-jet recording apparatus with said U-shaped or V-shaped portion at the bottom.

15. An ink-jet recording apparatus comprising:

a closed ink bladder of a flexible material for supplying ink to a recording head, a plug member mounted on said ink bladder and including a pair of upper and lower electrodes exposed to the ink in said ink bladder, a pair of inwardly extending ribs disposed on opposite sides of said plug member for forming a space surrounding said electrodes to prevent said ink bladder from completely collapsing onto said electrodes, and detection means for sensing a change in electrical resistance between said electrodes to detect the residual amount of ink within said ink bladder when gas enclosed in said ink bladder is disposed between said ribs.

16. An ink-jet recording apparatus as defined in claim 15, wherein one of said electrodes is rigidly mounted in said ink bladder and the other said electrode comprises an outlet pipe for conducting ink out of said ink bladder.

17. An ink-jet recording apparatus as defined in claim 16, wherein said outlet pipe is in the form of a hollow needle.

18. An ink-jet recording apparatus as defined in claim 15, further comprising an inward projection other than said ribs.

19. An ink-jet recording apparatus as defined in claim 18, wherein said projection is disposed between said ribs.

20. An ink-jet recording apparatus as defined in claim 18, wherein said projection is formed integrally with said plug member.

21. An ink tank suitable for use in an ink-jet recording apparatus, said tank comprising:

an ink bladder of a flexible material, a plug member for conducting ink out of said ink bladder, electrode means for sensing the amount of ink within said ink bladder, and inwardly extending rib means including a pair of rib members disposed on opposite sides of said plug member for forming a space surrounding said electrode means to prevent said ink bladder from completely collapsing onto said electrode means.

22. An ink tank as defined in claim 21, wherein said ribs have an inwardly extending length determined by a preset amount of ink to be sensed.

23. An ink tank as defined in claim 21, wherein said plug member is an elastomeric material.

24. An ink tank as defined in claim 21, wherein said electrode means is provided on said plug member.

25. An ink tank as defined in claim 21, further comprising an inward projection other than said ribs.

26. An ink tank as defined in claim 25, wherein said projection is disposed between said ribs.

27. An ink tank as defined in claim 25, wherein said projection is formed integrally with said plug member.

28. An ink tank as defined in claim 21, wherein said ink tank contains ink and gas.

29. An ink tank as defined in claim 28, wherein the amount of ink in said ink tank is determined by the amount of gas in said ink tank.

30. An ink tank as defined in claim 28, wherein the amount of said gas is equal to 0.5 c.c. or more.

31. An ink-jet recording apparatus comprising a plurality of ink reservoirs each for supplying ink to a corresponding one of a plurality of recording heads, a pair of electrodes disposed in each of said ink reservoirs and exposed to ink in said ink reservoir, all of said electrodes being connected in series, and detection means for measuring an electrical resistance between the electrodes on the opposite ends of said series connection to sense a residual amount of ink.

* * * * *

UNITED STATES PATENT AND TRADEMARK OFFICE
CERTIFICATE OF CORRECTION

PATENT NO. : 4,719,475 Page 1 of 2

DATED : January 12, 1988

INVENTOR(S) : TAKEHIKO KIYOHARA, ET AL.

It is certified that error appears in the above-identified patent and that said Letters Patent is hereby corrected as shown below: Title page:

AT [56] IN THE REFERENCES

"Ebinoma" should read --Ebinuma--.

COLUMN 1

Line 9, "blader" should read --bladder-.

COLUMN 3

Line 48, "print" should read --printing--.
Line 50, "print" should read --printing--.

COLUMN 5

Line 40, "very" should read --greatly--.
Line 52, "trate" should read --trates--.
Line 55, "existance" should read --existence--.

COLUMN 6

Line 4, "less number" should read --low magnitude--.
Line 5, "electrolized" should read --electrolyzed--.
Line 33, "is" should read --are--.

COLUMN 8

Line 24, "present" should read --preset--.
Line 33, "print" should read --printing--.
Line 33, "in" should read --ink--.

UNITED STATES PATENT AND TRADEMARK OFFICE
CERTIFICATE OF CORRECTION

PATENT NO. : 4,719,475

DATED : January 12, 1988

INVENTOR(S) : TAKEHIKO KIYOHARA, ET AL.

It is certified that error appears in the above-identified patent and that said Letters Patent is hereby corrected as shown below:

COLUMN 9

Line 47, "of ink" should read --of said ink--.

Signed and Sealed this

Twelfth Day of July, 1988

Attest:

DONALD J. QUIGG

*Attesting Officer* *Commissioner of Patents and Trademarks*